United States Patent
Tang (10) Patent No.: US 8,351,184 B2
(45) Date of Patent: Jan. 8, 2013

(54) ASSEMBLED FLEXIBLE TEXTILE CAPACITOR MODULE

(75) Inventor: Chien-Fa Tang, Taipei Hsien (TW)

(73) Assignee: Taiwan Textile Research Institute, New Taipei (TW)

( * ) Notice: Subject to any disclaimer, the term of this patent is extended or adjusted under 35 U.S.C. 154(b) by 459 days.

(21) Appl. No.: 12/628,393

(22) Filed: Dec. 1, 2009

(65) Prior Publication Data

US 2011/0080688 A1     Apr. 7, 2011

(30) Foreign Application Priority Data

Oct. 5, 2009   (TW) ................. 98133693 A (51) Int. Cl.
*H01G 5/38*     (2006.01)
*H01G 9/00*     (2006.01)

(52) U.S. Cl. .................. 361/522; 361/541; 361/328

(58) Field of Classification Search .................. 361/311, 361/328–330, 522, 541
See application file for complete search history.

(56) References Cited

U.S. PATENT DOCUMENTS

| | | | | |
|---|---|---|---|---|
| 3,611,051 A | * | 10/1971 | Puppolo et al. ................ | 361/531 |
| 2003/0033701 A1 | * | 2/2003 | Amatucci ...................... | 29/25.41 |
| 2007/0109723 A1 | * | 5/2007 | Kuriyama et al. ............. | 361/502 |

FOREIGN PATENT DOCUMENTS

| | | |
|---|---|---|
| JP | 2004-048897 | 2/2004 |
| TW | M253542 | 12/2004 |

* cited by examiner

*Primary Examiner* — Eric Thomas
(74) *Attorney, Agent, or Firm* — J.C. Patents (57) ABSTRACT

An assembled flexible textile capacitor module including a plurality of flexible textile capacitors and at least one flexible connecting board is provided. The flexible connecting board is connected electrically between two adjacent flexible textile capacitors, so that the flexible textile capacitors are connected in series, in parallel, or in series-parallel.

14 Claims, 6 Drawing Sheets

ASSEMBLED FLEXIBLE TEXTILE CAPACITOR MODULE

CROSS-REFERENCE TO RELATED APPLICATION

This application claims the priority benefit of Taiwan application serial no. 98133693, filed Oct. 15, 2009. The entirety of the above-mentioned patent application is hereby incorporated by reference herein and made a part of specification.

BACKGROUND OF THE INVENTION

1. Field of the Invention

The invention relates to a flexible textile capacitor module and more particularly to an assembled flexible textile capacitor module.

2. Description of Related Art

With the continuous progression of technology, not only has the textile technique improved, but products combining textiles with other elements have also been developed increasingly. Currently, textile capacitors capable of storing charges have been developed.

In patent document JP2004048897, a charging device of a power generator in a bicycle is disclosed, in which a super capacitor is adopted as an energy storage device of the bicycle. However, this type of charging devices cannot be combined freely for expansion and the voltage level is fixed.

Taiwan Patent No. M253542 discloses an improved power generator of a bicycle adopting a super capacitor, where the super capacitor is applied as the power supply of a display light of the bicycle. However, this type of generating structure cannot freely combine either, such that the application of these products remains limited.

SUMMARY OF THE INVENTION

The invention is directed to an assembled flexible textile capacitor module capable of freely combining a plurality of flexible textile capacitor modules through flexible connecting boards.

The invention is directed to an assembled flexible textile capacitor module including a plurality of flexible textile capacitors and at least one flexible connecting board. The flexible connecting board is connected electrically between two adjacent flexible textile capacitors, so that the flexible textile capacitors are connected in series, in parallel, or in series-parallel.

According to one embodiment of the invention, the flexible textile capacitors include a first flexible textile capacitor and a second flexible textile capacitor. The first flexible textile capacitor has two first positive electrode terminals electrically connected to each other and two first negative electrode terminals electrically connected to each other. The second flexible textile capacitor has two second positive electrode terminals electrically connected to each other and two second negative electrode terminals electrically connected to each other.

According to one embodiment of the invention, the first flexible textile capacitor further includes a first flexible textile capacitor device, and a terminal of the first flexible textile capacitor device is electrically connected to the first positive electrode terminals while the other terminal of the first flexible textile capacitor device is electrically connected to the first negative electrode terminals.

According to one embodiment of the invention, the second flexible textile capacitor further includes a second flexible textile capacitor device, and a terminal of the second flexible textile capacitor device is electrically connected to the second positive electrode terminals while the other terminal of the second flexible textile capacitor device is electrically connected to the second negative electrode terminals.

According to one embodiment of the invention, the flexible connecting board has a plurality of conductive contacts. In addition, the first positive electrode terminal, the first negative electrode terminal, the second positive electrode terminal, and the second negative electrode terminal are metal male threads, and the conductive contacts are metal female threads.

According to one embodiment of the invention, the first positive electrode terminal, the first negative electrode terminal, the second positive electrode terminal, and the second negative electrode terminal are metal female threads, and the conductive contacts are metal male threads.

According to an embodiment of the invention, the first flexible textile capacitor further has two first connecting terminals electrically connected to each other and a first rectification diode connecting the first connecting terminals and the first positive electrode terminals. The second flexible textile capacitor further has two second connecting terminals electrically connected to each other and a second rectification diode connecting the second connecting terminals and the second positive electrode terminals.

According to one embodiment of the invention, the first rectification diode includes a light emitting diode (LED).

According to one embodiment of the invention, the second rectification diode includes an LED.

According to an embodiment of the invention, the flexible connecting board has a plurality of conductive contacts.

According to one embodiment of the invention, the first positive electrode terminal, the first negative electrode terminal, the second positive electrode terminal, the second negative electrode terminal, the first connecting terminals, and the second connecting terminals are metal female threads, and the conductive contacts are metal male threads.

According to one embodiment of the invention, the first positive electrode terminal, the first negative electrode terminal, the second positive electrode terminal, the second negative electrode terminal, the first connecting terminals, and the second connecting terminals are metal male threads, and the conductive contacts are metal female threads.

According to one embodiment of the invention, the assembled flexible textile capacitor module further includes a carrier. The flexible textile capacitors and the flexible connecting board are disposed on the carrier and located within an accommodating space defined by the carrier.

According to one embodiment of the invention, the carrier has a cylindrical shape, a spiral coil shape, or a semi-cylindrical shape.

According to one embodiment of the invention, the assembled flexible textile capacitor module further includes an energy storage device connected electrically to the flexible textile capacitors and the flexible connecting board.

In light of the foregoing, the flexible textile capacitors and the flexible connecting board can be disposed in various manners. Hence, the assembled flexible textile capacitor module is capable of freely combining a plurality of flexible textile capacitor modules through flexible connecting boards to attain the desired size, type, and power consumption level.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
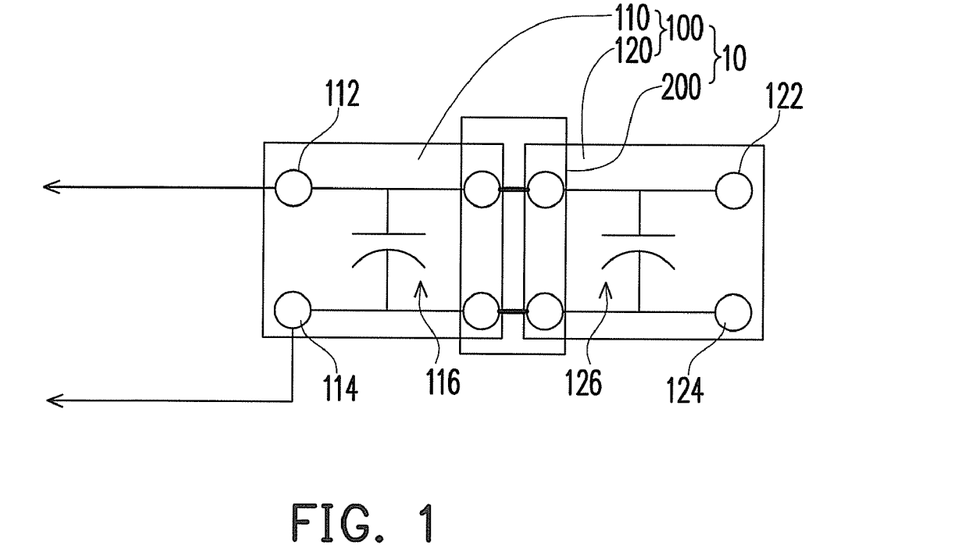
FIG. 1 is a schematic view of an assembled flexible textile capacitor module according to an embodiment of the invention.

FIG. 1 is a schematic view of an assembled flexible textile capacitor module according to an embodiment of the invention. Referring to FIG. 1, an assembled flexible textile capacitor module 10 includes a plurality of flexible textile capacitors 100 and at least one flexible connecting board 200. The flexible connecting board 200 is connected electrically between two adjacent flexible textile capacitors 100.

In the present embodiment, the flexible textile capacitor 100 includes a first flexible textile capacitor 110 and a second flexible textile capacitor 120. The first flexible textile capacitor 110 has two first positive electrode terminals 112 electrically connected to each other, two first negative electrode terminals 114 electrically connected to each other, and a first flexible textile capacitor device 116. A terminal of the first flexible textile capacitor device 116 is electrically connected to the first positive electrode terminals 112 while the other terminal thereof is electrically connected to the first negative electrode terminals 114.

The second flexible textile capacitor 120 also has two second positive electrode terminals 122 electrically connected to each other, two second negative electrode terminals 124 electrically connected to each other, and a second flexible textile capacitor device 126. A terminal of the second flexible textile capacitor device 126 is electrically connected to the second positive electrode terminals 122 while the other terminal thereof is electrically connected to the second negative electrode terminals 124.

It should be noted that, the flexible connecting board 200 connects the first flexible textile capacitor 110 and the second flexible textile capacitor 120, so that the first positive electrode terminal 112 connects with the second negative electrode terminal 124 and the first negative electrode terminal 114 connects with the second positive electrode terminal 122. As a consequence, the flexible connecting board 200 is capable of connecting the first flexible textile capacitor 110 and the second flexible textile capacitor 120 in series, thereby increasing the current supplied by the assembled flexible textile capacitor module 10.

Figure 2:
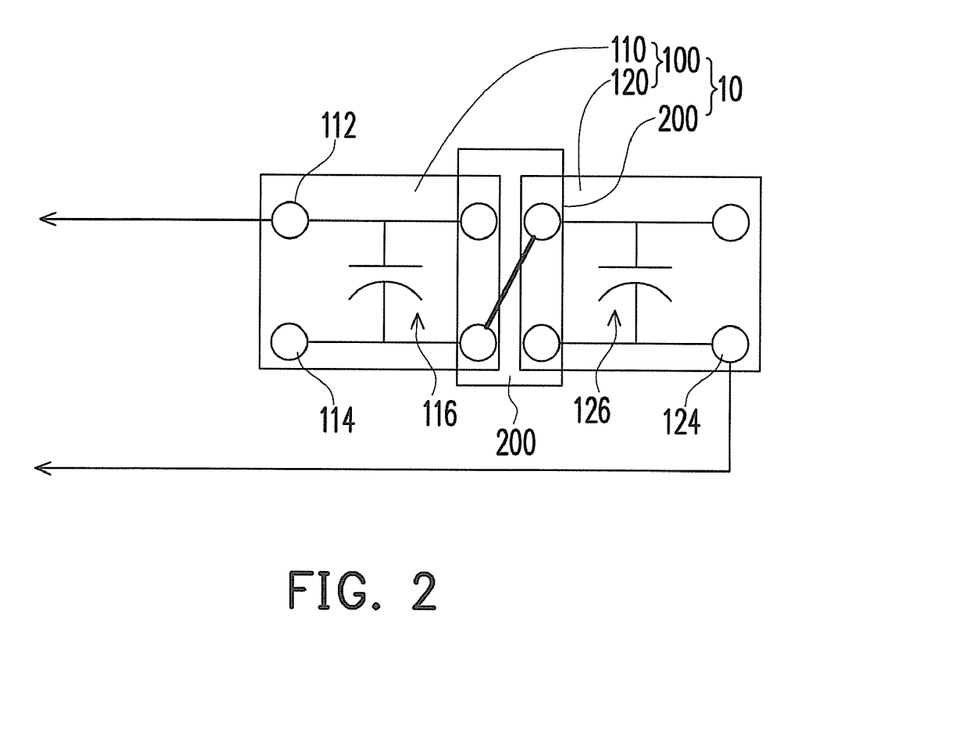
FIG. 2 is a schematic view of an assembled flexible textile capacitor module according to another embodiment of the invention.

FIG. 2 is a schematic view of an assembled flexible textile capacitor module according to another embodiment of the invention. Referring to FIG. 2, the flexible connecting board 200 connects the first flexible textile capacitor 110 and the second flexible textile capacitor 120, so that the first positive electrode terminal 112 connects with the second positive electrode terminal 122 and the first negative electrode terminal 114 connects with the second negative electrode terminal 124. As a consequence, the flexible connecting board 200 is capable of connecting the first flexible textile capacitor 110 and the second flexible textile capacitor 120 in series, thereby increasing the current supplied by the assembled flexible textile capacitor module 10.

Obviously, in other embodiments, the flexible connecting board 200 can also connect the first flexible textile capacitor 110 and the second flexible textile capacitor 120 in series-parallel. As illustrated in the above embodiment, the flexible textile capacitor 100 and the flexible connecting board 200 can be disposed in various manners. Additionally, the quantities of the flexible textile capacitors and the flexible connecting boards are not limited in the invention. In other words, the quantities of the flexible textile capacitors and the flexible connecting boards can be modified according to actual circumstances. Thus, the assembled flexible textile capacitor module 10 is capable of freely combining a plurality of flexible textile capacitor 100 through flexible connecting board 200 to attain the desired size, type, and power consumption level.

Specifically, the assembled flexible textile capacitor module 10 further includes an energy storage device (not shown). The energy storage device is connected electrically to the flexible textile capacitors 100 and the flexible connecting board 200. The energy storage device is adapted for storing solar energy, kinetic energy, magnetic energy, wind energy, and thermal energy, and converting these energies into electrical energy. Electrical energy is then supplied to the first flexible textile capacitor 110 and the second flexible textile capacitor 120, so as to charge the first flexible textile capacitor device 116 and the second flexible textile capacitor device 126. In particular, the energy storage device provides alternating current and direct current to the first flexible textile capacitor 110 and the second flexible textile capacitor 120 to meet actual demands.

Figure 3:
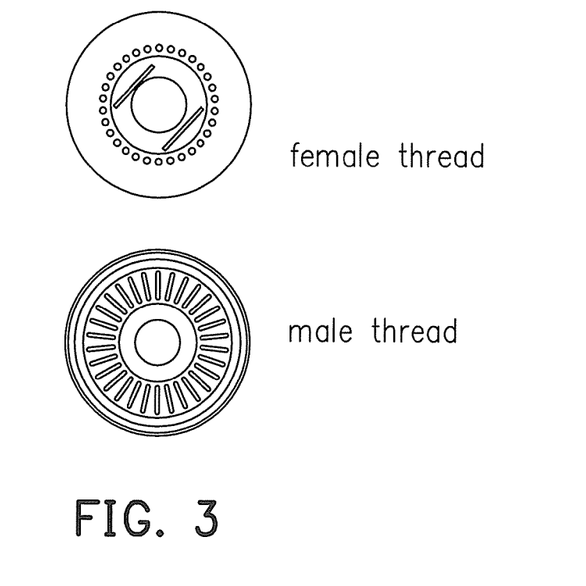
FIG. 3 is a schematic view illustrating a metal male thread and a metal female thread according to an embodiment of the invention.

FIG. 3 is a schematic view illustrating a metal male thread and a metal female thread according to an embodiment of the invention. Referring to FIGS. 1 to 3, in the present embodiment, the flexible connecting board 200 has a plurality of conductive contacts (not shown) configured for latching to the first positive electrode terminal 112, the first negative electrode terminal 114, the second positive electrode terminal 122, and the second negative electrode terminal 124. The conductive contacts can be metal female threads while the first positive electrode terminal 112, the first negative electrode terminal 114, the second positive electrode terminal 122, and the second negative electrode terminal 124 can be metal male threads. In another embodiment, the first positive electrode terminal 112, the first negative electrode terminal 114, the second positive electrode terminal 122, and the second negative electrode terminal 124 can be metal female threads while the conductive contacts can be metal male threads. The invention does not limit the thread type of the terminals and the conductive contacts.

As aforementioned, the conductive contacts can be connected to the first positive electrode terminal 112, the first negative electrode terminal 114, the second positive electrode terminal 122, and the second negative electrode terminal 124 directly by welding.

Figure 4:
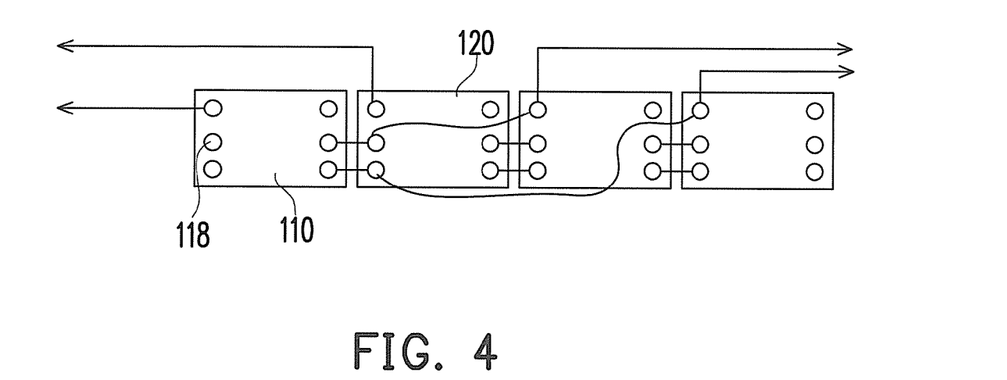
FIG. 4 is a schematic view of an assembled flexible textile capacitor module according to another embodiment of the invention.
Figure 5:
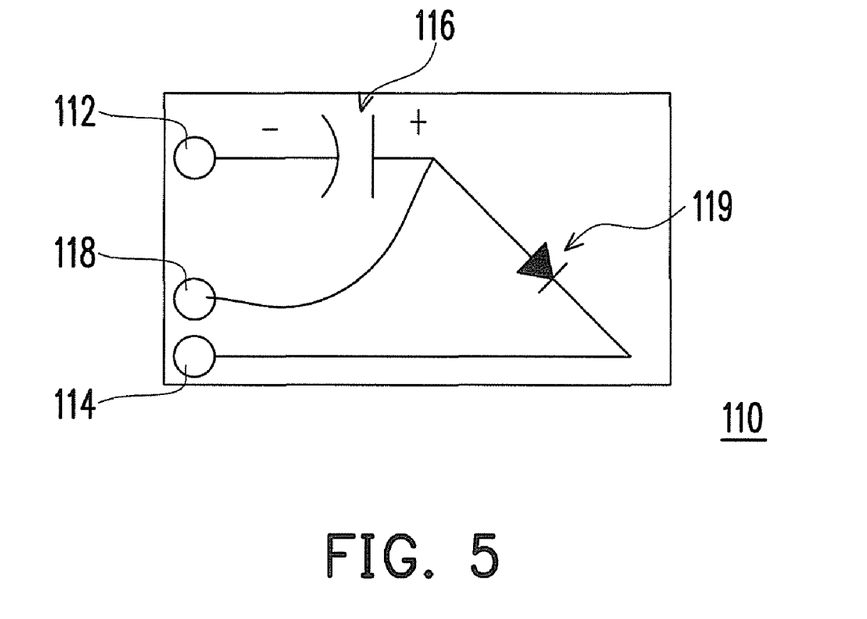
FIG. 5 is a schematic view illustrating a first flexible textile capacitor in FIG. 4.
Figure 6:
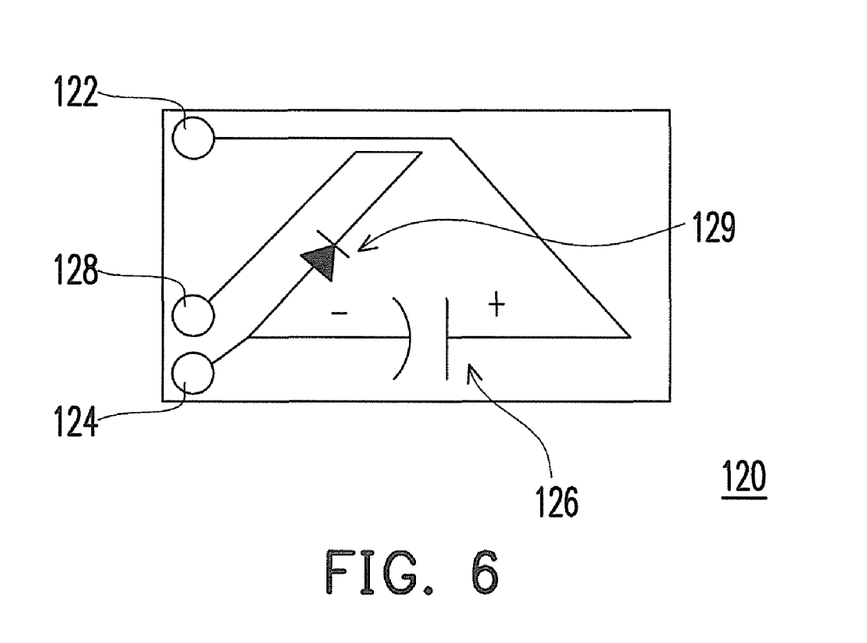
FIG. 6 is a schematic view illustrating a second flexible textile capacitor in FIG. 4.
Figure 7:
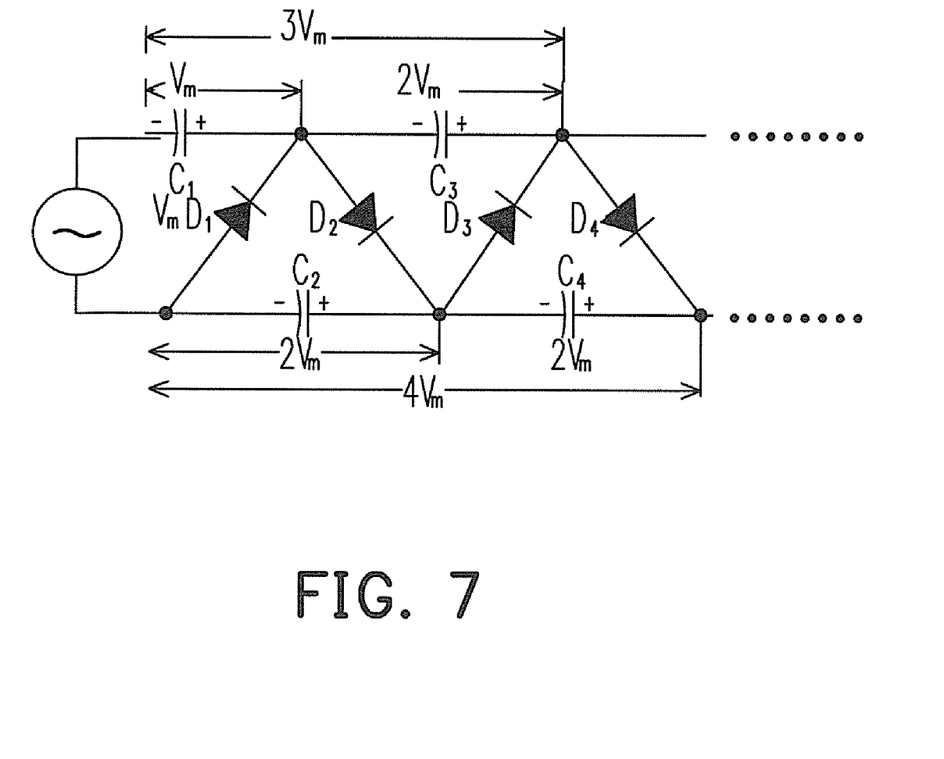
FIG. 7 is an equivalent circuit diagram of FIG. 4.

FIG. 4 is a schematic view of an assembled flexible textile capacitor module according to another embodiment of the invention. FIG. 5 is a schematic view illustrating a first flexible textile capacitor in FIG. 4. FIG. 6 is a schematic view illustrating a second flexible textile capacitor in FIG. 4. FIG. 7 is an equivalent circuit diagram of FIG. 4. Referring to FIGS. 4 to 7, the first flexible textile capacitor 110 further has two first connecting terminals 118 electrically connected to each other and a first rectification diode 119 connecting the first connecting terminal 118 and the first positive electrode terminal 112.

The second flexible textile capacitor 120 further has two second connecting terminals 128 electrically connected to each other and a second rectification diode 129 connecting the second connecting terminal 128 and the second positive electrode terminal 122. In the present embodiment, the first rectification diode 119 and the second rectification diode 129 are made of germanium or silicon. Moreover, the first rectification diode 119 and the second rectification diode 129 can also be LEDs.

The energy storage device supplies electrical energy to the first flexible textile capacitor 110 and the second flexible textile capacitor 120, so as to charge the first flexible textile capacitor device 116 and the second flexible textile capacitor device 126. In addition, the design of a voltage doubling rectification circuit allows the assembled flexible textile capacitor module 10 to provide stable power.

In the present embodiment, the first positive electrode terminal 112, the first negative electrode terminal 114, the second positive electrode terminal 122, the second negative electrode terminal 124, the first connecting terminal 118, and the second connecting terminal 128 are metal female threads, and the conductive contacts are metal male threads. In another embodiment, the first positive electrode terminal 112, the first negative electrode terminal 114, the second positive electrode terminal 122, the second negative electrode terminal 124, the first connecting terminal 118, and the second connecting terminal 128 are metal male threads while the conductive contacts are metal female threads.

Figure 8:
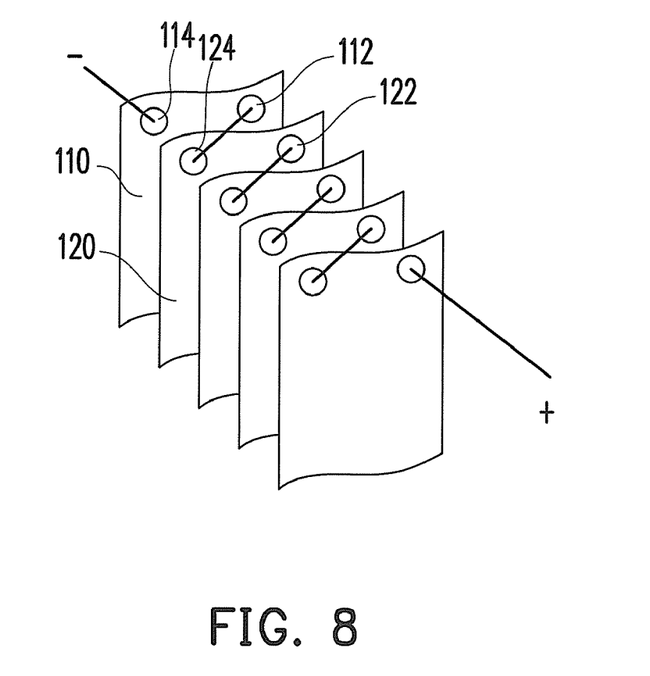
FIG. 8 is a schematic view of an assembled flexible textile capacitor module according to another embodiment of the invention.
Figure 9:
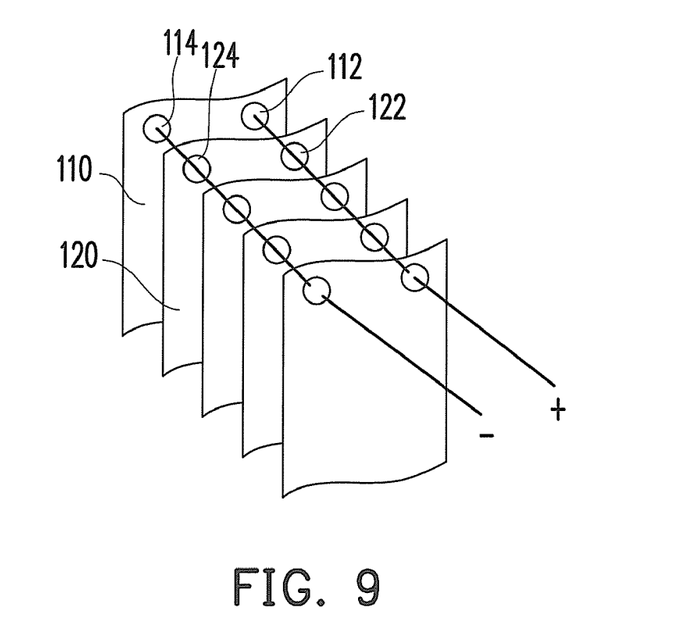
FIG. 9 is a schematic view of an assembled flexible textile capacitor module according to another embodiment of the invention.

FIG. 8 is a schematic view of an assembled flexible textile capacitor module according to another embodiment of the invention. FIG. 9 is a schematic view of an assembled flexible textile capacitor module according to another embodiment of the invention. Referring to FIG. 8 and FIG. 9, for example, in these two embodiments, other than being connected adjacently, the first flexible textile capacitor 110 and the second flexible textile capacitor 120 can also be series or parallel connected in a stack of multiple sheets.

Figure 10:
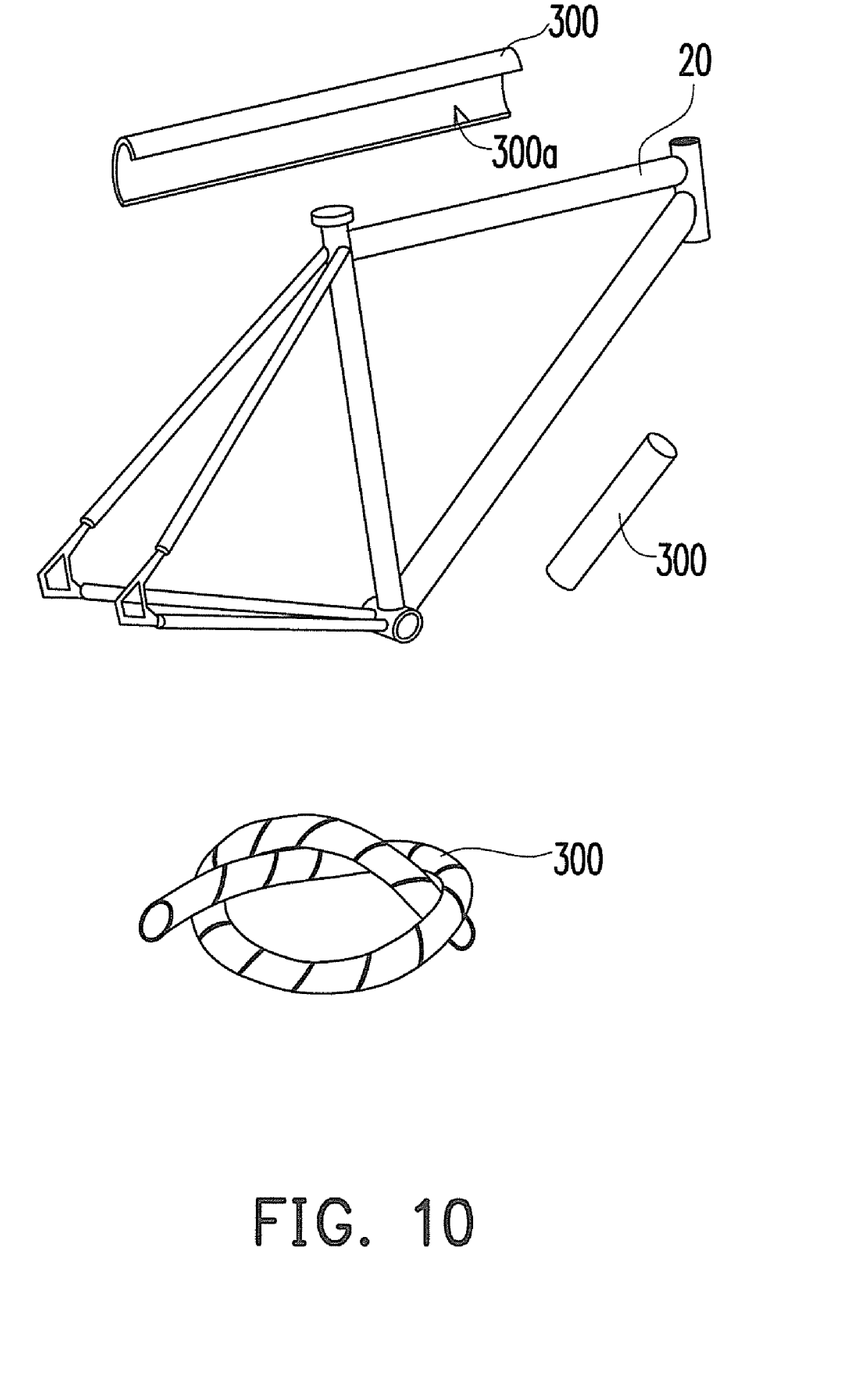
FIG. 10 is a schematic view of adopting an assembled flexible textile capacitor module in a bicycle according to an embodiment of the invention.

Furthermore, the assembled flexible textile capacitor module 10 of the invention has superior flexibility. The assembled flexible textile capacitor module 10 thus has diversified application. FIG. 10 is a schematic view of adopting an assembled flexible textile capacitor module in a bicycle according to an embodiment of the invention. Referring to FIG. 10, for example, the assembled flexible textile capacitor module 10 further includes a carrier 300. The carrier 300 has a cylindrical shape, a spiral coil shape, or a semi-cylindrical shape. The flexible textile capacitor 100 and the flexible connecting board 200 are disposed on the carrier 300 and located within an accommodating space 300a defined by the carrier 300. It should be noted that the carrier 300 is not an essential component. The assembled flexible textile capacitor module 10 can be assembled on other objects (i.e. a bicycle) without adopting the carrier 300. For instance, the assembled flexible textile capacitor module 10 can be placed inside the body of the bicycle directly, and no other carriers are required to facilitate the installation of the assembled flexible textile capacitor module 10.

In the present embodiment, the assembled flexible textile capacitor module 10 is adopted in a bicycle 20 (only parts are illustrated). The carrier 300 disposed with the flexible textile capacitor 100 and the flexible connecting board 200 is installed on a surface of the body or inside a tube body of the body of the bicycle. Additionally, in the present embodiment, the flexible textile capacitor 100 and the flexible connecting board 200 are rectangles. However, in practical application, shapes of the flexible textile capacitor 100 and the flexible connecting board 200 are not limited to rectangles. That is, the flexible textile capacitor 100 and the flexible connecting board 200 can be circles or random polygons so as to be applied practically.

When a user is riding a bicycle, a mechanical energy is inputted to the energy storage device. The energy storage device converts this mechanical energy to an electrical energy. The electrical energy is then supplied the assembled flexible textile capacitor module 10 to be stored in the flexible textile capacitor 100.

In summary, the assembled flexible textile capacitor module of the invention is capable of freely combining a plurality of flexible textile capacitor modules through the flexible connecting boards to attain the desired size, type, and power consumption level. The assembled flexible textile capacitor module can be disposed on the bicycle due to its feature of flexibility. The energy storage device then converts the mechanical energy generated from the pedaling of the user into an electrical energy. The electrical energy is then supplied the assembled flexible textile capacitor module so as to be stored in the flexible textile capacitor.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An assembled flexible textile capacitor module, comprising:
a plurality of flexible textile capacitors, the plurality of flexible textile capacitors comprises:
a first flexible textile capacitor having two electrically connected first positive electrode terminals and two electrically connected first negative electrode terminals; and
a second flexible textile capacitor having two electrically connected second positive electrode terminals and two electrically connected second negative electrode terminals, wherein the first positive electrode terminal, the first negative electrode terminal, the second positive electrode terminal, and the second negative electrode terminal are metal male threads, and the plurality of conductive contacts are metal female threads; and
at least one flexible connecting board, electrically connected between two adjacent flexible textile capacitors, wherein the plurality of flexible textile capacitors are connected in series, in parallel, or in series-parallel.

2. The assembled flexible textile capacitor module as claimed in claim 1, wherein the first flexible textile capacitor further comprises a first flexible textile capacitor device, a terminal of the first flexible textile capacitor device is electrically connected to the plurality of first positive electrode terminals, and the other terminal of the first flexible textile capacitor device is electrically connected to the plurality of first negative electrode terminals.

3. The assembled flexible textile capacitor module as claimed in claim 1, wherein the second flexible textile capacitor further comprises a second flexible textile capacitor device, a terminal of the second flexible textile capacitor device is electrically connected to the plurality of second positive electrode terminals, and the other terminal of the second flexible textile capacitor device is electrically connected to the plurality of second negative electrode terminals.

4. The assembled flexible textile capacitor module as claimed in claim 1, wherein the flexible connecting board has a plurality of conductive contacts.

5. The assembled flexible textile capacitor module as claimed in claim 1 further comprising a carrier, wherein the plurality of flexible textile capacitors and the flexible connecting board are disposed on the carrier and located within an accommodating space defined by the carrier.

6. The assembled flexible textile capacitor module as claimed in claim 5, wherein the carrier has a cylindrical shape, a spiral coil shape, or a semi-cylindrical shape.

7. The assembled flexible textile capacitor module as claimed in claim 1 further comprising an energy storage device connected electrically to the plurality of flexible textile capacitors and the flexible connecting board.

8. An assembled flexible textile capacitor module, comprising:
   a plurality of flexible textile capacitors, the plurality of flexible textile capacitors comprises:
   a first flexible textile capacitor having two electrically connected first positive electrode terminals and two electrically connected first negative electrode terminals; and
   a second flexible textile capacitor having two electrically connected second positive electrode terminals and two electrically connected second negative electrode terminals, wherein the first positive electrode terminal, the first negative electrode terminal, the second positive electrode terminal, and the second negative electrode terminal are metal female threads, and the plurality of conductive contacts are metal male threads; and
   at least one flexible connecting board, electrically connected between two adjacent flexible textile capacitors, wherein the plurality of flexible textile capacitors are connected in series, in parallel, or in series-parallel.

9. An assembled flexible textile capacitor module, comprising:
   a plurality of flexible textile capacitors, the plurality of flexible textile capacitors comprises:
   a first flexible textile capacitor having two electrically connected first positive electrode terminals and two electrically connected first negative electrode terminals; and
   a second flexible textile capacitor having two electrically connected second positive electrode terminals and two electrically connected second negative electrode terminals, wherein the first flexible textile capacitor further comprises two electrically connected first connecting terminals and a first rectification diode connecting the plurality of first connecting terminals and the plurality of first positive electrode terminals, and the second flexible textile capacitor further comprises two electrically connected second connecting terminals and a second rectification diode connecting the plurality of second connecting terminals and the plurality of second positive electrode terminals; and
   at least one flexible connecting board, electrically connected between two adjacent flexible textile capacitors, wherein the plurality of flexible textile capacitors are connected in series, in parallel, or in series-parallel.

10. The assembled flexible textile capacitor module as claimed in claim 9, wherein the first rectification diode comprises a light emitting diode.

11. The assembled flexible textile capacitor module as claimed in claim 9, wherein the second rectification diode comprises a light emitting diode.

12. The assembled flexible textile capacitor module as claimed in claim 9, wherein the flexible connecting board has a plurality of conductive contacts.

13. The assembled flexible textile capacitor module as claimed in claim 12, wherein the first positive electrode terminal, the first negative electrode terminal, the second positive electrode terminal, the second negative electrode terminal, the first connecting terminals, and the second connecting terminals are metal female threads, and the plurality of conductive contacts are metal male threads.

14. The assembled flexible textile capacitor module as claimed in claim 12, wherein the first positive electrode terminal, the first negative electrode terminal, the second positive electrode terminal, the second negative electrode terminal, the first connecting terminals, and the second connecting terminals are metal male threads, and the plurality of conductive contacts are metal female threads.

* * * * *